US011482887B2

(12) United States Patent
Sherman et al.

(10) Patent No.: US 11,482,887 B2
(45) Date of Patent: *Oct. 25, 2022

(54) SYSTEM FOR WIRELESS POWER CHARGING

(71) Applicant: POWERMAT TECHNOLOGIES LTD., Petah Tikva (IL)

(72) Inventors: Itay Sherman, Hod HaSharon (IL); Ilya Gluzman, Holon (IL); Elieser Mach, Rosh Tzurim (IL); Amir Salhuv, Nes Ziona (IL)

(73) Assignee: POWERMAT TECHNOLOGIES LTD., Petah Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,874

(22) Filed: Nov. 23, 2021

(65) Prior Publication Data

US 2022/0085656 A1 Mar. 17, 2022

Related U.S. Application Data

(63) Continuation of application No. 16/304,832, filed as application No. PCT/IL2018/050256 on Mar. 7, 2018, now Pat. No. 11,218,025.

(Continued)

(51) Int. Cl.
*H02J 50/12* (2016.01)
*H02J 50/00* (2016.01)
(Continued)

(52) U.S. Cl.
CPC .......... *H02J 50/12* (2016.02); *H01F 27/2804* (2013.01); *H02J 50/005* (2020.01); *H04B 5/0037* (2013.01); *H04B 5/0081* (2013.01)

(58) Field of Classification Search
CPC .......... H02J 50/12; H02J 50/005; H02J 50/50; H01F 27/2804; H04B 5/0037; H04B 5/0081
See application file for complete search history.

(56) References Cited

U.S. PATENT DOCUMENTS 8,855,554 B2 10/2014 Cook et al.
8,970,070 B2 3/2015 Sada et al.
(Continued)

FOREIGN PATENT DOCUMENTS

JP 2008-207875 A 9/2008
JP 2012-504387 A 2/2012
(Continued)

OTHER PUBLICATIONS

Extended European Search Report issued in European Application No. 18160589.0, dated May 24, 2018, 8 pages.
(Continued)

*Primary Examiner* — Lincoln D Donovan
*Assistant Examiner* — Alex W Lam
(74) *Attorney, Agent, or Firm* — Volpe Koenig

(57) ABSTRACT

A system for wirelessly charging, via a medium, a device having a receiver coil comprises at least one relay configured to inductively transfer power to the receiver coil of the device and a transmitter configured to inductively transmit, to the at least one relay, power for charging the device. A joint resonance frequencies of a transmitter resonance circuit and a relay resonance circuit have a main resonance frequency (MRF). The transmitter is configured to operate at an operational frequency (OPF) from a range of OPFs. The range of OPFs is different than the MRF. The at least one relay comprises a second relay coil connected in series to the first relay coil. One side of the second relay coil faces the device and a second side of the second relay coil is covered (Continued)

by a relay ferrite layer. The second relay coil is smaller than the first relay coil.

20 Claims, 6 Drawing Sheets

Related U.S. Application Data

(60) Provisional application No. 62/467,903, filed on Mar. 7, 2017.

(51) Int. Cl.
*H01F 27/28* (2006.01)
*H04B 5/00* (2006.01)

(56) References Cited

U.S. PATENT DOCUMENTS

| | | | |
|---|---|---|---|
| 9,054,542 | B2 | 6/2015 | Baarman |
| 9,126,490 | B2 | 9/2015 | Cook et al. |
| 9,306,635 | B2 | 4/2016 | Kurs et al. |
| 9,465,064 | B2 | 10/2016 | Roy et al. |
| 9,496,598 | B2 * | 11/2016 | Orihara .................. H01Q 7/06 |
| 9,508,487 | B2 | 11/2016 | Von Novak et al. |
| 9,558,884 | B2 | 1/2017 | Shimokawa et al. |
| 9,625,501 | B2 | 4/2017 | Van Wageningen |
| 9,692,238 | B2 | 6/2017 | Matsumoto et al. |
| 9,711,277 | B2 | 7/2017 | Ogasawara et al. |
| 9,742,199 | B2 | 8/2017 | Abe |
| 9,768,643 | B2 | 9/2017 | Kanno et al. |
| 9,831,917 | B2 | 11/2017 | Ichikawa et al. |
| 9,954,397 | B2 | 4/2018 | Bunsen |
| 10,148,119 | B2 | 12/2018 | Kanahara et al. |
| 10,181,755 | B2 | 1/2019 | Hosotani et al. |
| 10,250,083 | B2 | 4/2019 | Taylor et al. |
| 10,340,077 | B2 | 7/2019 | Miyamoto |
| 2008/0079392 | A1 | 4/2008 | Baarman et al. |
| 2008/0157603 | A1 | 7/2008 | Baarman et al. |
| 2009/0096413 | A1 | 4/2009 | Partovi et al. |
| 2009/0174263 | A1 | 7/2009 | Baarman et al. |
| 2010/0109445 | A1 | 5/2010 | Kurs et al. |
| 2010/0181841 | A1 | 7/2010 | Azancot et al. |
| 2011/0037322 | A1 | 2/2011 | Kanno |
| 2011/0133569 | A1 * | 6/2011 | Cheon .................... H02J 50/80 307/104 |
| 2011/0227530 | A1 | 9/2011 | Karalis et al. |
| 2011/0291790 | A1 | 12/2011 | Okumura et al. |
| 2012/0063505 | A1 | 3/2012 | Okamura et al. |
| 2012/0193993 | A1 | 8/2012 | Azancot et al. |
| 2012/0235503 | A1 | 9/2012 | Kesler et al. |
| 2013/0015699 | A1 * | 1/2013 | Mita ..................... B60L 53/126 307/104 |
| 2013/0020862 | A1 | 1/2013 | Miller et al. |
| 2013/0026851 | A1 | 1/2013 | Taguchi |
| 2013/0062965 | A1 | 3/2013 | Chernokalov et al. |
| 2013/0094598 | A1 | 4/2013 | Bastami |
| 2013/0249306 | A1 * | 9/2013 | Kim ...................... H02J 50/50 307/104 |
| 2013/0249479 | A1 | 9/2013 | Partovi |
| 2014/0015329 | A1 | 1/2014 | Widmer et al. |
| 2014/0015330 | A1 | 1/2014 | Byun et al. |
| 2014/0021798 | A1 | 1/2014 | Kesler et al. |
| 2014/0111154 | A1 | 4/2014 | Roy et al. |
| 2014/0184150 | A1 | 7/2014 | Walley |
| 2014/0239735 | A1 | 8/2014 | Abe et al. |
| 2014/0264517 | A1 | 9/2014 | Kim et al. |
| 2014/0265617 | A1 | 9/2014 | Roy et al. |
| 2015/0061585 | A1 | 3/2015 | Obayashi et al. |
| 2015/0249484 | A1 | 9/2015 | Mach et al. |
| 2015/0303995 | A1 | 10/2015 | Staring et al. |
| 2015/0372496 | A1 | 12/2015 | Lee et al. |
| 2016/0056637 | A1 | 2/2016 | Hwang |
| 2016/0056664 | A1 | 2/2016 | Partovi |
| 2016/0181818 | A1 | 6/2016 | Joye et al. |
| 2016/0181822 | A1 | 6/2016 | Yang et al. |
| 2016/0254701 | A1 | 9/2016 | Tsuda et al. |
| 2016/0329753 | A1 | 11/2016 | Gluzman et al. |
| 2017/0018977 | A1 | 1/2017 | Van Wageningen et al. |
| 2017/0054330 | A1 | 2/2017 | You et al. |
| 2017/0163070 | A1 | 6/2017 | Lawrenson et al. |
| 2017/0194816 | A1 | 7/2017 | Tsuda et al. |
| 2017/0353046 | A1 | 12/2017 | Chen et al. |
| 2020/0287419 | A1 | 9/2020 | Sherman et al. |
| 2020/0287425 | A1 | 9/2020 | Sherman et al. |
| 2020/0328617 | A1 | 10/2020 | Sherman et al. |

FOREIGN PATENT DOCUMENTS

| | | |
|---|---|---|
| JP | 2014-068507 A | 4/2014 |
| JP | 2014-207796 A | 10/2014 |
| JP | 2015-053781 A | 3/2015 |
| JP | 2015-164398 A | 9/2015 |
| JP | 2015-181334 A | 10/2015 |
| JP | 2016-101079 A | 5/2016 |
| WO | 2011097608 A2 | 8/2011 |
| WO | 2012058466 A1 | 5/2012 |
| WO | 2013036947 A2 | 3/2013 |
| WO | 2013056234 A2 | 4/2013 |
| WO | 2015150107 A1 | 10/2015 |
| WO | 2016/157758 A1 | 10/2016 |
| WO | 2017012979 A1 | 1/2017 |
| WO | 2017134101 A1 | 8/2017 |

OTHER PUBLICATIONS

Extended European Search Report issued in European Application No. 18160590.8, dated May 11, 2018, 8 pages.
Extended European Search Report issued in European Application No. 18160592.4, dated Jun. 4, 2018, 8 pages.
Extended European Search Report issued in European Application No. 18160593.2, dated May 25, 2018, 8 pages.
International Preliminary Report issued in International Application No. PCT/IL2018/050256, dated Sep. 19, 2019, 6 pages.
International Preliminary Report issued in International Application No. PCT/IL2018/050258, dated Sep. 19, 2019, 6 pages.
International Preliminary Report issued in International Application No. PCT/IL2018/050260, dated Sep. 19, 2019, 6 pages.
International Preliminary Report issued in International Application No. PCT/IL2018/050266, dated Sep. 19, 2019, 6 pages.
International Search report and Written Opinion issued in International Application No. PCT/IL2018/050256, dated Jul. 4, 2018, 26 pages.
International Search report and Written Opinion issued in International Application No. PCT/IL2018/050258, dated on Jul. 5, 2018, 24 pages.
International Search report and Written Opinion issued in International Application No. PCT/IL2018/050260, dated Jul. 5, 2018, 10 pages.
International Search report and Written Opinion issued in International Application No. PCT/IL2018/050266, dated Jul. 2, 2018, 24 pages.
Notice of Opposition to a European Patent dated Jul. 14, 2020 for European Patent Application No. EP 18160592.4.
"Wireless power transfer," https://en.wikipedia.org/wiki/Wireless_power_transfer, Available at: https://web.archive.org/web/20170302161952/https://en.wikipedia.org/wiki/Wireless_power_transfer (Mar. 2, 2017).
Japanese Office Action dated Mar. 1, 2022 for Japanese Patent Application No. 2019-548393.
Japanese Office Action dated Mar. 8, 2022 for Japanese Patent Application No. 2019-548378.
Japanese Office Action dated Mar. 1, 2022 for Japanese Patent Application No. 2019-548446.
Japanese Office Action dated Mar. 1, 2022 for Japanese Patent Application No. 2019-548372.

(56) References Cited

OTHER PUBLICATIONS

Japanese Office Action dated Sep. 6, 2022 for Japanese Patent Application No. 2019-548372.

* cited by examiner

SYSTEM FOR WIRELESS POWER CHARGING

CROSS-REFERENCE TO RELATED APPLICATION

The present application is a continuation of U.S. patent Ser. No. 16/304,832, filed Nov. 27, 2018, which is a National Phase filing under 35 U.S.C. § 371 of International Patent Application No. PCT/IL2018/050256, filed Mar. 7, 2018, which is based upon and claims under 35 U.S.C. § 119(e) the benefit of the priority date of U.S. Provisional Patent Application Ser. No. 62/467,903 filed Mar. 7, 2017, each of which is expressly incorporate by reference for all purposes in its entirely

TECHNICAL FIELD

The present disclosed subject matter relates to wireless power charging systems. More particularly, the present disclosed subject matter relates to multi loads induction charging through medium.

BACKGROUND

Growing demand for wireless power charging systems, led to dramatic deployments increase, in a wide variety of venues, raises the need for increasing the effective charging distance between a transmitter and a receiver. Commercially available systems are limited to a maximum distance of approx. 10 millimeters between a transmitter and a receiver of such system.

Wireless power charging systems are usually deployed in public facilities such as restaurants, coffee shops, airports, bus stations; train stations, banks, schools, libraries, hotels, official building, or the like. Typically, the systems are installed on top of surfaces, such as tables, bars, or the like that are accessible to users, thus require decorative appearance and hazards free installation. To meet these requirements on one hand and distance limitations on the other, requires wiring to be routed on top of the surface as well as drilling the surface to make for the distance limitation. In some cases, the transmitter of such commercially available systems can be installed inside the cutout hole in the surface, which complicate the installation and raise its cost, on top of damaging the customer's furniture.

Clearly, such commercially available solutions are not desired in the consumers marketplace. Moreover, the wireless power charging level of these available solutions is limited for charging handheld devices requiring less than 15 watts.

SUMMARY

According to a first aspect of the present disclosed subject matter, a system for wirelessly charging a device, having a built-in coil, via a medium comprising: at least one relay adapted to inductively transfer power for charging the device; and a transmitter configured to inductively transmit to the at least one relay the power for charging the device, wherein the transmitter and the relay are separated by the medium and wherein the relay and the transmitter substantially face each other; wherein the transmitter further comprises a transmitter coil and a transmitter capacitor constituting a transmitter resonance circuit, wherein the relay further comprises a relay coil and a relay capacitor constituting a relay resonance circuit, and wherein a joint resonance frequencies (JRF) of both resonance circuits have a main resonance frequency (MRF); and wherein the transmitter operates at an operational frequency (OPF) selected from a range of OPFs, wherein the range of OPFs is substantially different than the MRF.

In some exemplary embodiments, the transmitter coil and of the relay coil are substantially facing each other and wherein the transmitter coil and the relay coil are substantially equal in size and substantially larger than a standard built-in coil.

In some exemplary embodiments, wherein the transmitter further comprises a transmitter electronics and a ferrite layer, wherein the ferrite layer is situated as a buffer between the transmitter coil and the transmitter electronics, and wherein the transmitter coil faces the relay via the medium.

In some exemplary embodiments, wherein the relay further comprises a relay ferrite layer having an opening, wherein the relay ferrite layer lies on the relay coil on a side that face the device, and wherein the opening shape and size sustainably match or is slightly larger than a size of the built-in coil.

In some exemplary embodiments, the relay comprising a second relay coil connected in series to the relay coil, wherein one side of second relay coil face the device and the other side is covered by a second relay ferrite layer, and wherein the second relay coil shape and size sustainably match or is slightly larger than a size of the built-in coil, and is substantially smaller than the first relay coil.

In some exemplary embodiments, the relay coil and the second relay coil are arranged on two plains.

In some exemplary embodiments, the relay further comprises a plurality of second relay coils for simultaneously charge a plurality of devices, wherein the plurality of the second relay coils is a plurality of load-coils each having a resonant capacitor thereby constituting a plurality of load-coils resonance circuits all connected in parallel to the relay resonance circuit, wherein each load-coil having a different resonance frequency is adapted to charge one device of the plurality of devices.

In some exemplary embodiments, the transmitter electronics is configured to determine the OPF and the rang of the OPFs for controlling the power transmission by a pulse width modulation (PWM) signal, and wherein the transmitter electronics is also configured to communicate with the device.

In some exemplary embodiments, the transmitter controls power transmission to each load-coil by interleaved PWM signal, wherein the interleaved PWM signal is comprised of timeslots, each of which is dedicated for specific load-coil, and wherein, each timeslot is comprised of PWM signal of the specific load-coil.

In some exemplary embodiments, the timeslot has a duration, wherein the duration is determined based power needs of each device, and wherein the power needs are communicated by each device of the plurality of devices to the transmitter.

In some exemplary embodiments, the transmitter electronics is configured to synchronize the plurality of devices communication to avoid communication overlapping between at least two devices.

In some exemplary embodiments, the transmitter electronics is configured to synchronize the plurality of devices communication by changing the delivered power to one of the at least two overlapping devices.

In some exemplary embodiments, were the transmitter electronics is capable of simultaneously distinguish between the plurality of devices communications by utilizing filters tuned around resonance frequencies of the built-in coils.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

DETAILED DESCRIPTION

Figure 1:
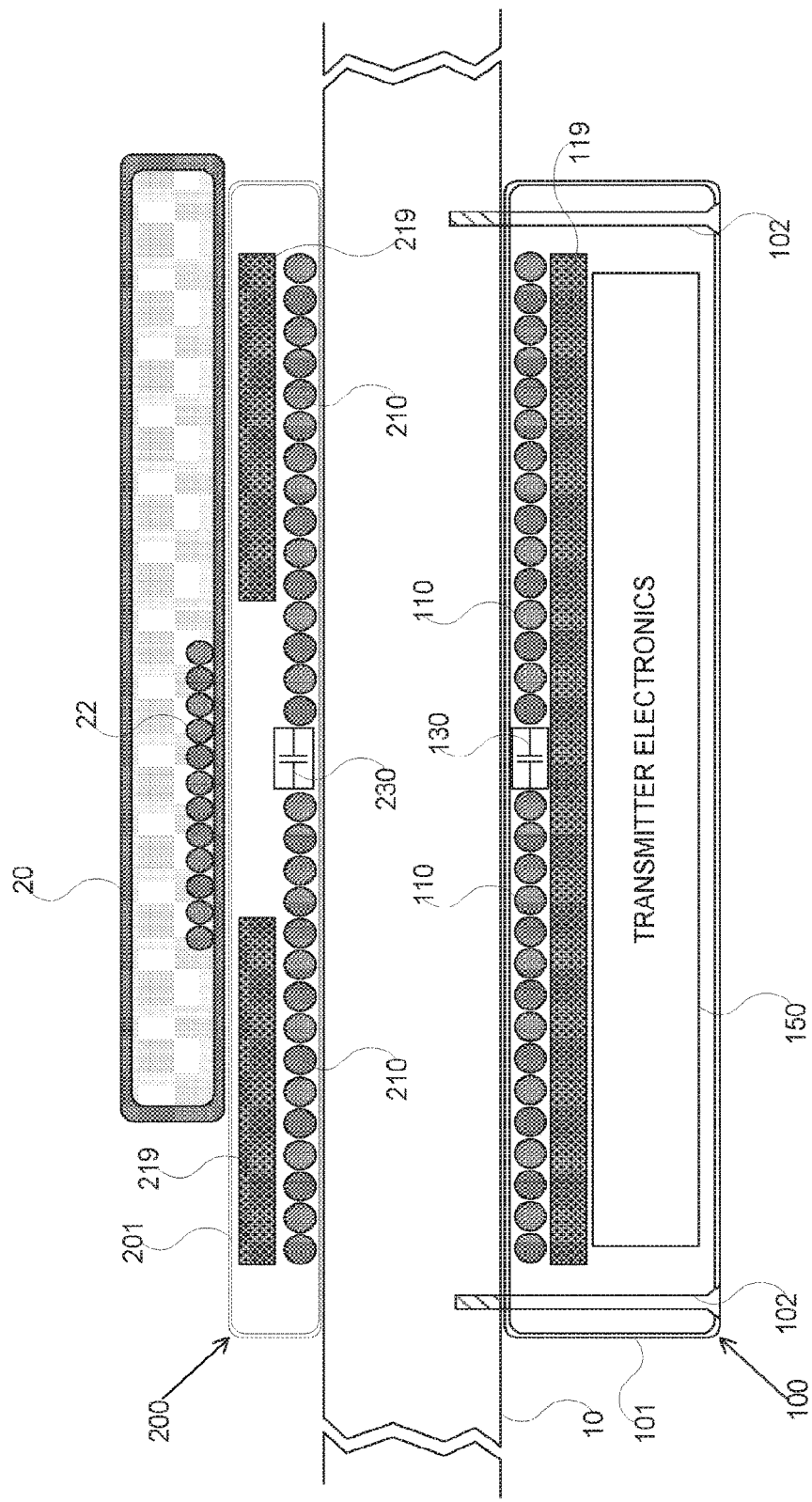
FIG. 1 shows a cross-section view of an installation of wireless power charging system, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

Referring now to FIG. 1 showing a cross-sectional view of an installation of wireless power charging system, in accordance with some exemplary embodiments of the disclosed subject matter. The wireless power charging system may be comprised of a transmitter (Tx) 100 and at least one relay 200.

In some exemplary embodiments, Tx 100 may be mounted on one side of a medium 10, whereas the relay 200 may be mounted on the opposite side of the medium 10. The medium 10 may be made of any material that doesn't conduct electricity, such as for example wood, plastic granite, marble, a combination thereof, or the like. It will be noted that in the present disclosure, medium 10 refers to surfaces, such as tables, desks, bars, or the like that are accessible to users in public venues. For example: restaurants, coffee shops, airports, bus stations; train stations, banks, schools, libraries, hotels, official building, or the like.

In some exemplary embodiments, the Tx 100 comprises a transmitter coil (Lt) 110; a transmitter capacitor (Ct) 130; a transmitter ferrite (Tx-ferrite) 119, and a transmitter electronics (Tx-elec.) 150; all incorporated inside a transmitter enclosure (Tx enclosure) 101 that may be secured to medium 10 by fasteners 102.

In some exemplary embodiments, the relay 200 may comprise a relay coil (Lr) 210; a relay ferrite 219, and a relay capacitor (Cr) 230; all incorporated in a relay enclosure 201 that may be secured to an opposite side of medium 10. Enclosure 201 may have a shape and form factor of a mat, a pad, a saucer, a coaster, a combination thereof, or the like. The enclosure 201 of relay 200 can be secured to medium 10 by glue or any other method, which guarantee that relay 200 and Tx 100 overlap one another from both sides of medium 10. It will be noted that, relay 200 and Tx 100 overlap each other so that Lt 110 and Lr 210 shall be substantially aligned, to face one another, for optimizing the inductance between the two, as depicted in FIG. 1.

In some exemplary embodiments, Tx 100, with is powered by power supply (PS) 160 (not shown), can be configured to utilize relay 200 for inductively (wirelessly) charge device 20 placed on relay 200. Device 20 may be a user's device such as a tablet, a laptop a Smartphone, or any chargeable mobile handsets; which comprise a built-in coil 22 configured to receive inductive power and charge a battery of the device 20. It should be noted that, the built-in coil 22 refers to standard receiver's coils of the devices listed above, typically this standard receiver's coils have a diameter of approximately 40 millimeters.

It should be noted that, the terminology of components Lt 110, Lr 210/Lr 310 and coil 22 in the present disclosure correspond to: first Tx coil, second Tx coil and Rx coil, respectively, of the related provisional patent applications.

Similar to Lr 210 and Lt 110, coil 22 and Lr 210 may substantially face and overlap each other, i.e. centers of coil 22 and Lr 210 can be aligned, in order to meet one of the effective charging criteria's. To ensure the alignment, enclosure 201 of the relay 200 can be marked with a layout that indicates to a user, the optimal place for positioning device 20 on top of relay 200 so as to gain effective charging. However, the wireless power charging system may be adapted to provide power charging even if device 20 is not precisely positioned on top of relay 200 as depicted in FIG. 1.

In some exemplary embodiments, both Lr 210 and Lt 100 may be flat spiral air core coils, having a diameter greater than 100 mm. The utilization of such large coils allows for relatively high coupling between Lr 210 and Lt 100 despite a thickness equal to or greater than 30 millimeters of medium 10. In the embodiment depicted in FIG. 1, the coupling factor between Lr 210 and Lt 100 may be greater than 0.25. The coupling between typical coil 22 and Lr 210 may be greater than 0.15 in the embodiment depicted in FIG. 1.

In some exemplary embodiments, Tx 100 comprises a transmitter ferrite (Tx-ferrite) 119. Tx-ferrite 119 can be a layer made of ferrite material with suitable magnetic characteristics of permeability & core losses. One technical reason for utilizing the Tx-ferrite 119 is providing a buffer for protecting Tx-electronics 150 from inductive energy. Another technical reason for utilizing the Tx-ferrite 119 can be to increase the magnetic field facing relay 200; thus, the inductance of the Lt 110. Tx-ferrite 119 properties such as thicknesses, flexibility, fragility a combination thereof, or the like can be dictated by an application in which the system of the present disclosure is provided. For example, the thickness and the material from which the medium 10 is made of. Since Lt 110 may have a shape of a circle, the shape of Tx-ferrite 119 may also be a circle, having a diameter equal to or bigger than the Lt 110 external diameter. Alternatively, Tx-ferrite 119 may have a shape of any geometric plane figure as long as Lt 110 external diameter is an inscribed circle within the geometric plane figure.

In some exemplary embodiments, relay 200 may comprise a relay ferrite 219. Relay ferrite 219 may be a layer made of ferrite material similar to Tx-ferrite 119. One technical reason for utilizing the Relay ferrite 219 is to provide a buffer for protecting the electronic circuitry of device 20 from inductive energy. Another technical reason for utilizing the relay ferrite 219 may be to increase the magnetic field facing the Tx100; thus, the inductance of Lr 210. Relay ferrite 219 possesses properties similar to the properties of Tx-ferrite 119. Since Lr 210 can have a shape of a circle, the shape of relay ferrite 219 can also be a circle having a diameter equal to or bigger than the Lr 210 external diameter. Alternatively, Relay ferrite 219 may have a shape of any geometric plane figure as long as Lr 210 external diameter is an inscribed circle within the geometric plane figure.

It should be noted that relay ferrite 219 requires a cutout situated at its center. The size of the cutout can be equal to or slightly larger than an external diameter of a typical receiver coil of a chargeable device, such as coil 22 of device 20. The shape of the cutout may be a circle or any geometric surface that surrounds coil 22 shape in order to allow passage of magnetic flux between Lr 210 and coil 22.

In some exemplary embodiments of the disclosed subject matter, at least one resonance capacitor (Ct) 130 can be connected in series to Lt 110 and at least one resonance capacitor (Cr) 230 can be connected in series to Lr 210. The resonant capacitors are placed inside the inner diameter space of each coil accordingly. Alternatively, the resonant capacitors can be placed next to the outer diameter space of each coil accordingly, or elsewhere within the respected enclosure.

The relay ferrite 219 of the present disclosure increases the coupling factor of coil 22 and Lr 210 to better simulate a behavior of a coil 22 with commercially available standard transmission coil, and also reduces any direct coupling from Lt 110 to coil 22, which is not desired in the system of the present disclosure. In addition, the resonance capacitors of both the Tx 100 and relay 200 are intended to stabilize the system operational point, dependency of coil 22 loads and allow high efficiency in power transfer. In some exemplary embodiments, the resonance frequency of Lt 110 and Ct 130, (i.e. Tx 100 LC circuit), can be set to be significantly lower than the resonance frequency of a typical coil such as coil 22 (approximately 100 kHz) and substantially lower than the resonance frequency of Lr 210 and Cr 230 (i.e. relay 200 LC circuit).

In some exemplary embodiments, a combination of the Tx 100 and the relay 200 LC circuits, when no load is present, may form two distinct resonance frequencies, hereinafter, joint resonance frequencies (JRF). The first resonance frequency of the JRF, may be adjacent to Tx 100 LC circuit's resonance frequency; however, lower in any case. The second resonance frequency of JRF may be adjacent to relay 200 LC circuit's resonance frequency, however higher in any case. It should be noted that the phrase "a combination of the Tx 100 and the relay 200 LC circuits" refers in the present disclosure to a state where Tx 100 and relay 200 face each other, such as depicted in FIG. 1 and power is applied to the Tx 100. It should also be noted that the second resonance frequency, i.e. higher resonance frequency, shall be regarded as the present disclosure system main resonance frequency (MRF).

The resonance frequency of Tx 100 LC circuit and relay 200 LC circuit are designed in such a way that their JRF, with no Coil 22 on them, is tuned to be a specific range (typically 2050 kHz) lower than the desired maximal operational frequency of the Tx100 and is higher than coil 22 resonance frequency.

As an example, the inductance of Lt 110 may be approximately 300 μH; the capacitance of Ct 130 may be approximately 290 μF which provides a Tx 100 LC circuit's resonance frequency of approximately 54 kHz. Whereas, the inductance of Lr 210 may be approximately 60tiFI; the capacitance of Ct 130 may be approximately 37.5 nF which provides a relay 200 LC circuit's resonance frequency of approximately 106 kHz. In such preferred exemplary embodiment, the system MRF may be 117 kHz (i.e. higher than 106 kHz of the relay 200 LC circuit's resonance frequency) providing that the gap between installed relay 200 and Tx 110 may be approximately 30 millimeters. Also, the outer diameter of Lt110 and Lr210 may be approximately 125 millimeters, whereas the cutout diameter in ferrite 219 may be approximately 55 millimeters.

In some exemplary embodiments, an operating frequency (OPF) may range between 121 kHz-140 kHz, where the lower OPF of the range may be 4 kHz higher than the MRF, i.e. 117 kHz. and maximal frequency may be 5 kHz lower than a regulatory limit, i.e. 145 kHz. Alternatively, the maximal OPF may be set below the MRF and the regulatory maximal frequency limit. For an installation having similar coils as the example described above, with a medium 10 thickness of 0.5", the MRF may be at 140 kHz. Thus, the operational range may be set to 115 kHz-136 kHz, were the maximal frequency is 4 kHz lower than the MRF and lower than the regulatory limit.

It will be understood that the system of the present disclosed avoids operation at resonance frequencies. The preferred OPF of the present disclosure system may be at a range of frequencies that are shifted to a frequency either lower or higher than the main resonance frequency (MRF).

Figure 2:
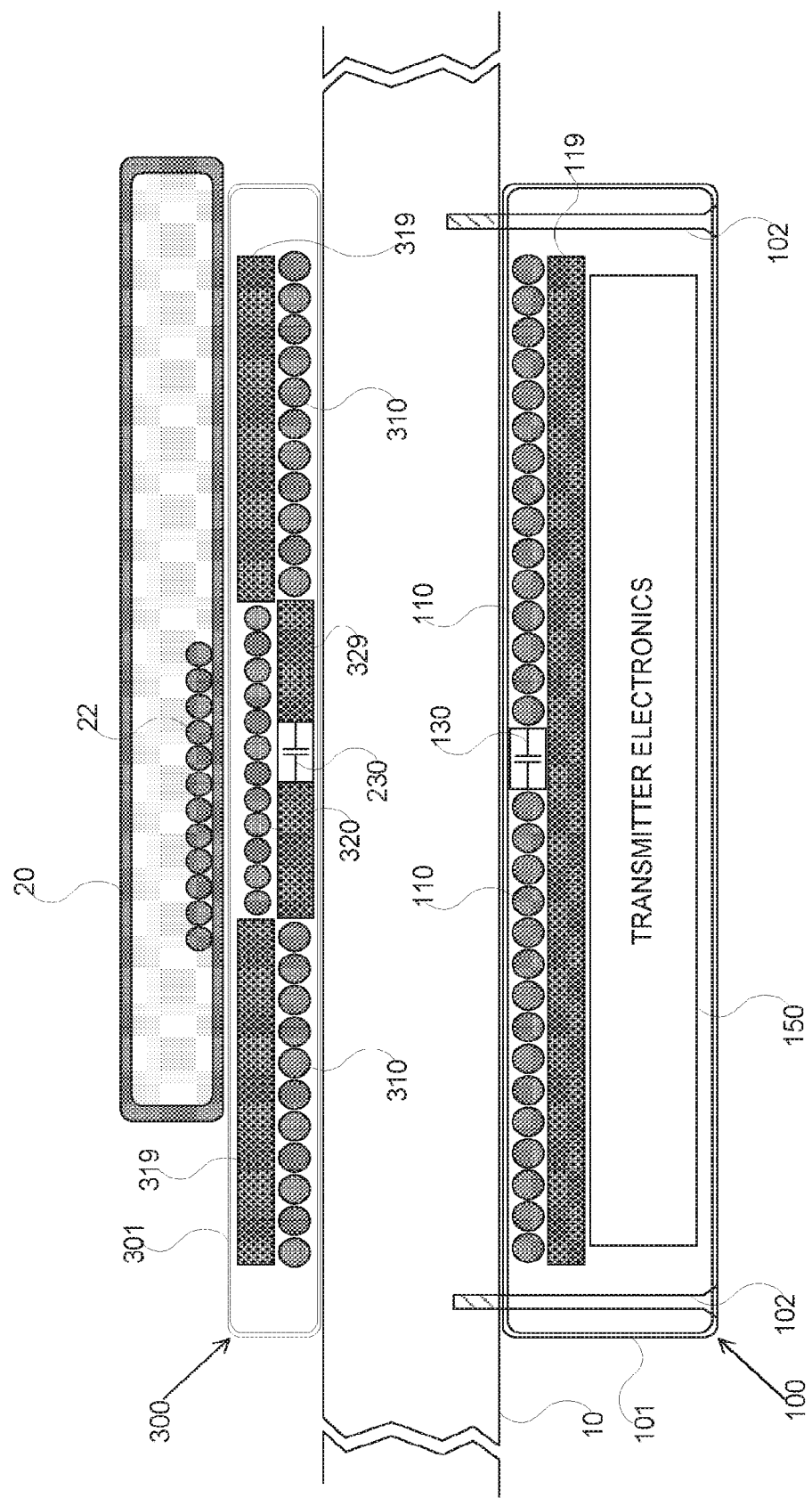
FIG. 2 shows a cross-section view of an installation of another wireless power charging system, in accordance with some exemplary embodiments of the disclosed subject matter.

Referring now to FIG. 2 showing a cross-sectional view of an installation of another wireless power charging system, in accordance with some exemplary embodiments of the disclosed subject matter.

In some exemplary embodiments, Tx 100 may be mounted on one side of a medium 10, whereas the relay 300 may be mounted on the opposite side of the surface 10. The medium 10 can be made of any material that doesn't conduct electricity, such as for example wood, plastic granite, marble, a combination thereof, or the like. It will be noted that in the present disclosure, medium 10 refers to surfaces such as tables, desks, bars, or the like that are accessible to users in public venues. For example: restaurants, coffee shops, airports, bus stations; train stations, banks, schools, libraries, hotels, official building, or the like.

In some exemplary embodiments, the Tx 100 comprises a transmitter coil (Lt) 110; a transmitter capacitor (Ct) 130; a transmitter ferrite (Tx-ferrite) 119, and a transmitter electronics (Tx-elec.) 150; all incorporated inside a transmitter enclosure (Tx enclosure) 101 that is secured to medium 10 by fasteners 102.

In some exemplary embodiments, the relay 300 comprises a relay coil (Lr) 310; a second relay coil (sLr) 320; a relay ferrite 319; a second relay ferrite 329 and a relay capacitor (Cr) 330; all incorporated in a relay enclosure 301 that may be secured to an opposite side of medium 10. Enclosure 301 can have a shape and form factor of a mat, a pad, a saucer, a coaster, a combination thereof, or the like. The relay 300 enclosure 301 can be secured to medium 10 by glue or any other method that guarantee that relay 300 and Tx 100 overlap to one another from both sides of medium 10. It will be noted that relay 300 and Tx 100 overlap each other so that Lt 110 and Lr 310 shall be substantially aligned so as to face one another, for optimizing the inductance between the two, as depicted in FIG. 2.

In some exemplary embodiments, Tx 100 is powered by power supply (PS) 160 (not shown in FIG. 2, shown in FIG. 3), may be configured to utilize relay 300 for inductively (wirelessly) charge device 20 placed on relay 300. Device 20 may be a user's device such as a tablet, a laptop a Smartphone, or any chargeable mobile handsets, that comprise a built-in coil 22 configured to receive inductive power and charge a battery of the device 20.

In some exemplary embodiments of the disclosed subject matter, relay 300 may further comprise a secondary relay coil sLr 320 that can be electrically connected in series with Lr 310. Instead, Lr 310 can be arranged in two parts that are situated in two planer heights, wherein the inner coil (i.e. sLr 320) or alternatively part of Lr 310 is elevated compared to the outer part of Lr 310 that face Lt 110.

Coil 22 and sLr320 can substantially face and overlap each other, i.e. centers of coil 22 and sLr 320 are align in order to meet one of the effective charging criteria's. For alignment, enclosure 301 of the relay 300 may be marked with a layout that indicates to a user the optimal place for positioning device 20 on top of relay 300 in order to gain effective charging. However, the wireless power charging system may be adapted to provide power charging even if device 20 is not precisely positioned on top of relay 300 as depicted in FIG. 2.

In some exemplary embodiments, both Lr 310 and Lt 100 may be flat spiral air core coils having a diameter greater than 100 mm, while sLr 320, also having a flat spiral air core coil, may have a smaller diameter that suits typical receiver's coils such as coil 22. The utilization of such large coils allows relatively high coupling between Lr 310 and Lt 100 in order to overcome a thickness equal to or greater than 30 mm of medium 10. In the embodiment depicted in FIG. 2, the coupling factor between Lr 310 and Lt 100 may be greater than 0.25, for medium thickness of up to 30 millimeters. The coupling between typical coil 22 and sLr 320 may be greater than 0.15 in the embodiment depicted in FIG. 2.

It should be noted that sLr 320 may not be directly influenced by Lt 110 because the second relay ferrite 329 blocks the magnetic field (to be described in detail further below); however, the same current induced to Lr 310 flows through sLr 320, since Lr 310 and sLr 320 are connected in series.

In some exemplary embodiments, Tx 100 may comprise a transmitter ferrite (Tx-ferrite) 119. Tx-ferrite 119 may be a layer made of ferrite material with suitable magnetic characteristics of permeability & core losses. One technical reason for utilizing the Tx-ferrite 119 may be to provide a buffer for protecting the Tx-elec. 150 from inductive energy. Another technical reason for utilizing the Tx-ferrite 119 may be to increase the magnetic field facing relay 300, and thus the inductance of Lt 110. Tx-ferrite 119 properties such as thicknesses, flexibility, fragility a combination thereof, or the like may be dictated by an application in which the system of the present disclosure may be provided. For example, the thickness and the material from which the medium 10 is made of. Since Lt 110 may have a shape of a circle, the shape of Tx-ferrite 119 may also be a circle having a diameter equal to or bigger than the Lt 110 external diameter. Alternatively, Tx-ferrite 119 may have a shape of any geometric plane figure as long as Lt 110 external diameter is an inscribed circle within the geometric plane figure.

In some exemplary embodiments, relay 300 may comprise a relay ferrite 319. Relay ferrite 319 can be a layer made of ferrite material similar to Tx-ferrite 119. One technical reason for utilizing the Relay ferrite 319 may be to provide a buffer for protecting the electronic circuitry of device 20 from inductive energy. Another technical reason for utilizing the relay ferrite 319 is to increase the magnetic field facing the Tx100; thus, increase the inductance of Lr 310. Relay ferrite 319 may possess properties similar to the properties of Tx-ferrite 119. Since Lr 310 may have a shape of a circle, the shape of relay ferrite 319 may also be a circle having a diameter equal to or bigger than the Lr 310 external diameter. Alternatively, relay ferrite 319 can have a shape of any geometric plane figure as long as Lr 310 external diameter is an inscribed circle within the geometric plane figure.

It should be noted that relay ferrite 319 may require a cutout situated at its center. The size of the cutout may be equal or slightly larger than an external diameter of a typical receiver coil of a chargeable device such as coil 22 of device 20. The shape of the cutout may be a circle or any geometric plane that surround coil 22 shape in order to allow magnetic flux to pass between Lr 310 and coil 22.

In some exemplary embodiments of the disclosed subject matter, the relay 300 further comprises a second relay ferrite 329 configured to block magnetic field induced by Lt 110 to sLr 320 and enhance the sLr 320 inductance toward coil 22. The second relay ferrite 329 possesses properties similar to the properties of Tx-ferrite 119 and relay ferrite 319. The shape ferrite 329 may be equal to or slightly larger than the cutout shape of relay ferrite 319. Practically, the cutout of relay ferrite 319 can be used as ferrite 329 that is situated inside the inner diameter of Lr 310 and at the same plane, while the sLr 320 may be situated on top of ferrite 229.

In some exemplary embodiments of the disclosed subject matter, at least one resonance capacitor (Ct) 130 can be connected in series to Lt 110 and at least one resonance capacitor (Cr) 330 may be connected in series to Lt 310. The resonant capacitors may be placed inside the inner diameter space of each coil accordingly. Alternatively, the resonant capacitors can be placed next to the outer diameter space of each coil accordingly, or elsewhere within the respected enclosure.

The relay ferrite 319 of the present disclosure increases the coupling factor of coil 22 and Lr 310 to better simulate a behavior of a coil 22 with commercially available standard transmission coil and also reduces any direct coupling from Lt 110 to coil 22, which is not desired in the system of the present disclosure. In addition, the resonance capacitors of both the Tx 100 and relay 300 are intended to stabilize the system operational point, dependency of coil 22 loads and allow for high efficiency in power transfer. In some exemplary embodiments, the resonance frequency of Lt 110 and Ct 130, (i.e. Tx 100 LC circuit) may be set to be significantly lower than the resonance frequency of a typical coil 22 (approximately 100 kHz) and substantially lower than the resonance frequency of Lr 310 and Cr 330 (i.e. relay 300 LC circuit).

In some exemplary embodiments, a combination of the Tx 100 and the relay 300 LC circuits, when no load is present, may form two distinct resonance frequencies, hereinafter, joint resonance frequencies (JRF). The first resonance frequency of JRF can be adjacent to Tx100 LC circuit's resonance frequency, however, in any case, it will be lower. The second resonance frequency of JRF, can be adjacent to relay 300 LC circuit's resonance frequency, however, it will be higher. It should be noted that the phrase "a combination of the Tx 100 and the relay 300 LC circuits" refers in the present disclosure to a state where Tx 100 and relay 300 face each other, as depicted in FIG. 2, and power is applied to the Tx 100. It should also be noted that the second resonance frequency, i.e. higher resonance frequency, shall be regarded in the present disclosure system as main resonance frequency (MRF).

The resonance frequency of Tx 100 LC circuit and relay 300 LC circuit are designed in such way that their JRF, with no Coil 22 on them, is tuned to be of a specific range (typically 2050 kHz) that is lower than the desired maximal OPF of the Tx 100 and is higher than coil 22 resonance frequency.

In one preferred exemplary embodiment, the inductance of Lt 110 can be approximately 300 µH; the capacitance of Ct 130 can be approximately 290 µF which provides a Tx 100 LC circuit's resonance frequency of approximately 54 kHz. Whereas, the inductance of Lr 310 can be approximately 600 µH; the capacitance of Ct 130 can be approximately 37.5 nF which provides a relay 300 LC circuit's resonance frequency of approximately 106 kHz. In such preferred exemplary embodiment, the system MRF can be 117 kHz (i.e. higher than 106 kHz of the relay 300 LC circuit's resonance frequency) providing that the gap between the installed relay 300 and the Tx 110 can be approximately 30 millimeters. Also, the outer diameter of Lt110 and Lr310 may be approximately 125 millimeters, whereas the outer diameter of Lr320 may be approximately 55 millimeters.

In some exemplary embodiments, an OPF ranges between 121 kHz-140 kHz, where the lower OPF of the range can be 4 kHz higher than the MRF, i.e. 117 kHz., and the maximal frequency can be 5 kHz lower than a regulatory limit, i.e. 145 kHz. Alternatively, the maximal OPF can be set below the MRF and the regulatory maximal frequency limit. For an installation having similar coils as in the example described herein above, with a medium thickness of 0.5", the MRF can be at 140 kHz. Thus, the operational range can be set to 115 kHz-136 kHz, were the maximal frequency is 4 kHz lower than the MRF and lower than the regulatory limit.

Figure 3:
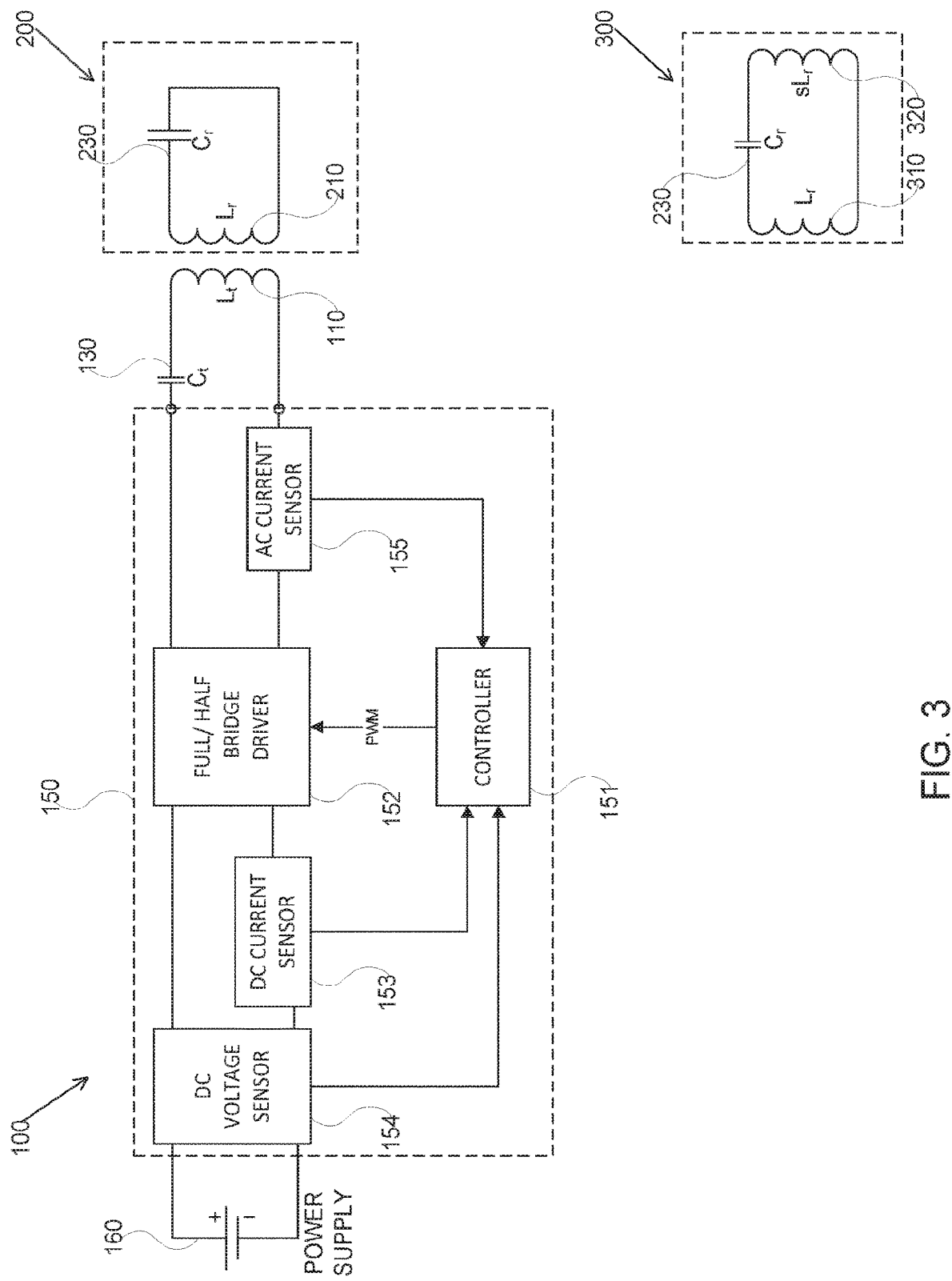
FIG. 3 shows a block diagram of a system for wireless power charging through medium, in accordance with some exemplary embodiments of the disclosed subject matter.

Referring now to FIG. 3 showing a block diagram of system for wireless power charging through medium, in accordance with some exemplary embodiments of the disclosed subject matter. The system for wireless power charging through medium comprises a PS 160, a Tx 100 transmitter and either a relay 200 or relay 300.

In some exemplary embodiments, the system can be adapted to utilize Tx 100 for charging a user's chargeable device, such as device 20 of FIGS. 1 and 2, via either a relay 200 or relay 300. Both relay 200 and relay 300 can be passive electronic circuit acting as repeaters for wirelessly transmitting charging energy to device 20 or the like. Relay 200 can comprise at least one coil (inductor) and one capacitor that form an LC resonance circuit, such as depicted in FIG. 1. An alternative relay, i.e. relay 300, can be provided in order to enhance the inductance and coupling with coil 22 of device 20. Relay 300 comprises at least two coils and one capacitor that form an LC resonance circuit such as the circuit depicted in FIG. 2.

In some exemplary embodiments, Tx 100 can comprise a transmitter electronics (Tx elect) 150, at least one Lx 110 coil, and a capacitor Ct 130, configured for inducing current in the coils of either relay 200 or relay 300, as depicted in FIG. 1 and FIG. 2 respectively.

In some exemplary embodiments, the Tx-elect 150 comprises of a controller 151; a full or half bridge driver 152, a DC current sensor 153, a DC voltage sensor 154, and an AC current sensor 155.

Controller 151 can be a central processing unit (CPU), a microprocessor, an electronic circuit, an integrated circuit (IC), or the like. Additionally, or alternatively, controller 151 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Controller 151 can be utilized to perform computations required by Tx 110 or any of its subcomponents.

In some exemplary embodiments of the disclosed subject matter, the controller 151 is configured to determine the following parameters:
 a. DC voltage across PS 160 by acquiring and measuring an outcome of DC voltage sensor 154.
 b. DC current supplied by PS 160 by acquiring and measuring an outcome of DC current sensor 153.
 c. AC current supplied to Lt 110 by acquiring and measuring an outcome of AC current sensor 155. Alternatively, output AC current can be determined by sensing instantaneous current flowing to the driver from the power supply with DC current sensor 153.

It should be noted that determining parameters for AC current can comprise peak current, average of absolute current, RMS current, amplitude of first harmonic, and any combination thereof, or the like In some exemplary embodiments, controller 151 comprises a semiconductor memory component (not shown). The memory may be persistent or volatile memory, such as for example, a flash memory, a random-access memory (RAM), a programable read only memory (PROM), a re-programmable memory (FLASH), and any combination thereof, or the like.

In some exemplary embodiments, the memory retains program code to activate controller 151 to perform acts associated with determining a pulse width modulation (PWM) signal that controls the full or half bridge driver 152. Driver 152 can adjust the output current flowing through Lt 110, i.e. power provided by the Tx 100, by modulating the OPF and/or duty cycle of the current flowing through Lt 110. In some exemplary embodiments, the PWM signal generated in the controller 151 tunes the modulation to satisfy the wireless charging needs of a load, such as device 20. In an alternative embodiment, the amplitude of the DC power supply may be controlled.

It should be noted that the PWM signal frequency and duty cycle can be set by controller 151, within the OPF range, as previously described. Additionally, controller 151 can change the OPF within the OPF range based on the power demand of the device 20.

In some exemplary embodiments, the controller 151 can utilize its memory to retain, connectivity software, monitoring information, configuration and control information and application associated with charging management of the present disclosure system.

In some exemplary embodiments, the controller 151 can be configured to communicate with device 20 based on protocols that comply with the following communications standards: power matters alliance (PMA); wireless power consortium (WPC) and AirFuel Alliance. According to these communication methods, but not limited to, the controller 151 can be configured to acquire user's credentials from device 20 in order to authenticate users for granting and regulating charging services. Additionally or alternatively, the controller 151 can be also configured to acquire from device 20, its power requirements.

For the sake of simplifying the explanation of the methods hereinafter, relay 200 and relay 300 may be referred to as "relay", also coils Lr 210 and Lr 310 may be referred to as "Lr". It should be noted that the following methods apply for both relay 200 and relay 300 and their respected subcomponents.

It will also be noted that the solutions/procedures described hereinafter may utilize a calibration method disclosed in a co-pending application submitted by the applicant of the subject matter disclosed herein on the same date. The co-pending application is incorporated in its entirely by reference. In some exemplary embodiments, the calibration method may also yield determining of coupling factor (k) between a Tx 100 and a relay, JRF, MRF, OPF, OPF range, digital ping, and any combination thereof, or the like of the Tx 100. In some exemplary embodiments, the coupling factor (k) is a predetermined value.

Another primary objective of the present disclosure is to extend the capabilities of the system depicted in FIGS. 1-3, by adding a plurality of relays, such as relay 300, for providing larger charging area and/or simultaneously charge a plurality device 20, wherein the plurality of relays may be supported by single Tx 100.

Figure 4A:
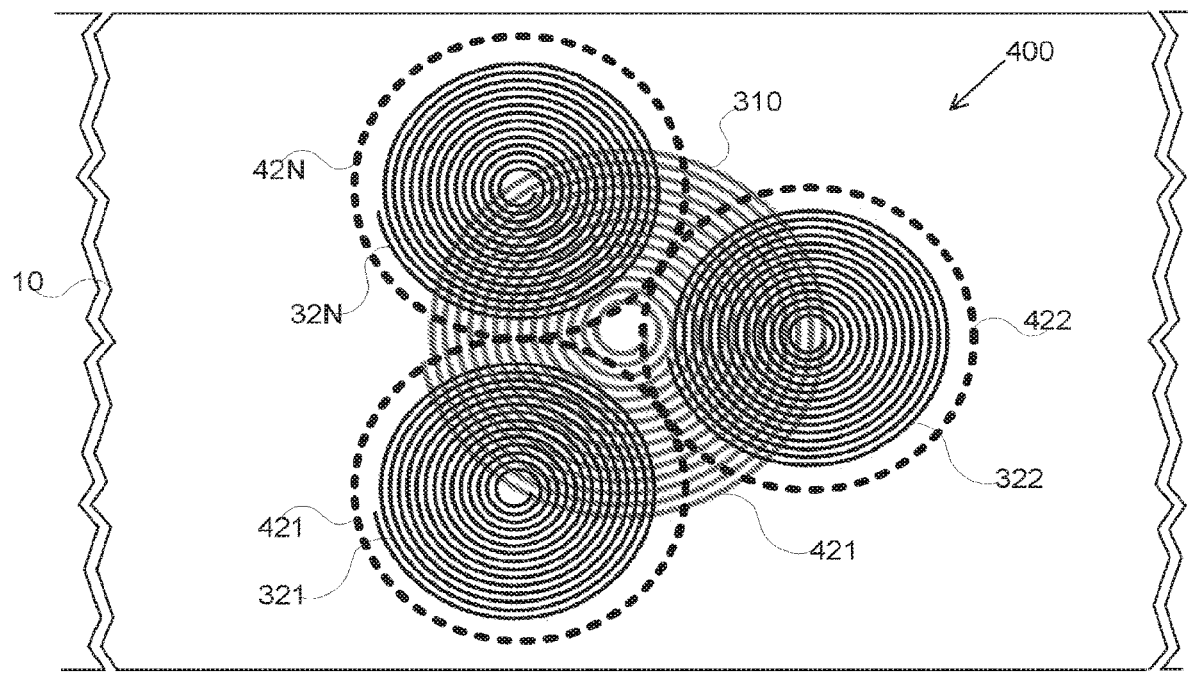
FIG. 4A shows a top view illustration of a multiload relay layout of a system for wireless power charging through medium, in accordance with some exemplary embodiments of the disclosed subject matter.

Referring now to FIG. 4A showing a top view illustration of a multiload relay 400 layout of a system for wireless power charging through medium, in accordance with some exemplary embodiments of the disclosed subject matter. The multiload relay 400 may be based on the same principal structure of relay 300 as shown in FIG. 3.

In some exemplary embodiments, the system for wireless power charging through medium may comprise a multiload relay 400 instead of relay 300. The system may be based on the same transmitter Tx 100 (not shown) as depicted in the exemplary FIGS. 1, 2 and 3. Tx 100 may be mounted on one side of a medium 10, whereas the multiload relay 400 may be mounted on the opposite side of the medium 10.

In some exemplary embodiments, the multiload relay 400 may be comprised of an Lr 310 and a plurality of load coils equivalent to the secondary relay coil sLr 320, of exemplary FIG. 3, wherein each load coil may be configured to charge one device, such as device 20 of exemplary FIGS. 1 and 2.

The multiload relay 400 may be secured to medium 10 to guarantee that multiload relay 400 and Tx 100 overlap one another from both sides of medium 10. It will be noted that multiload relay 400 and Tx 100 overlap each other so that Lt 110 and Lr 310 shall be substantially aligned, to face one another, for optimizing the inductance between the two, as depicted in FIG. 2.

In some preferred embodiments of the disclosed subject matter, multiload relay 400 may comprise three (but not limited to) load coils 1Lr 321, 2Lr 322 and NLr 32N which may be arranged in one plane, whereas the Lr 310 may be situated in a parallel plane that face the Tx 100 (medium 10). In some exemplary embodiments, the center of Lr 310 may be positioned in the same distance from the center of each load-coil. load coils 1Lr 321, 2Lr 322 and NLr 32N may be separated from the Lr 310 by ferrite layer, which provides increase inductance as well as isolation of the magnetic fields created by Lt 110 from the devices 20 facing the load coils. The device 20 facing a side of the multi load coil 400 may be marked with spots, such as 421, 422 and 42N. The spots indicate to a user, the optimal place for positioning device 20 on top of multiload relay 400 in order to gain effective charging. It should be noted that all coils of the multiload relay may be flat spiral air core coils having similar properties as relay 300.

Figure 4B:
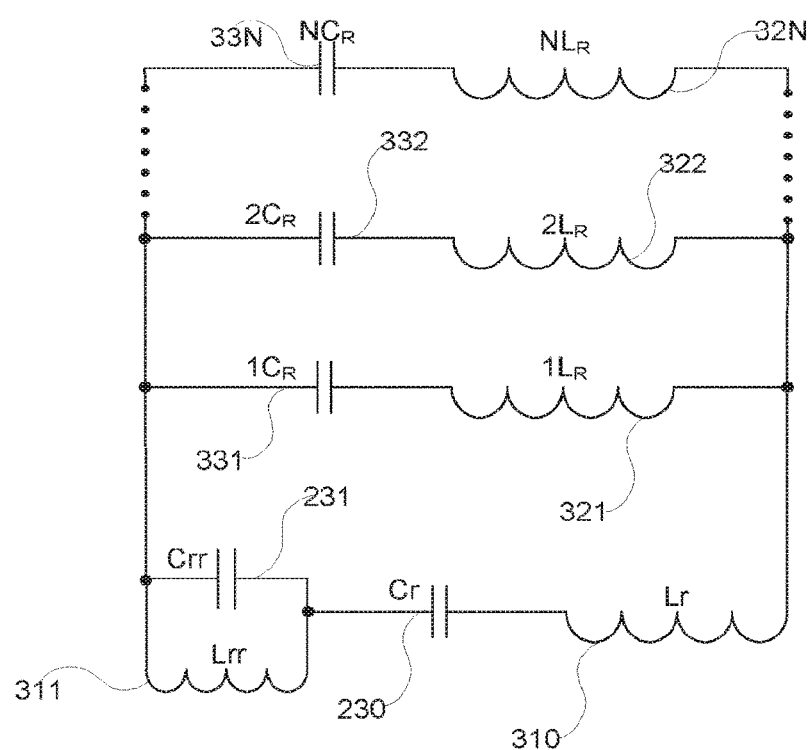
FIG. 4B shows principle schematics of the multiload relay of a system for wireless power charging through medium, in accordance with some exemplary embodiments of the disclosed subject matter.

Referring now to FIG. 4B showing principle schematics of the multiload relay 400 of a system for wireless power charging through medium, in accordance with some exemplary embodiments of the disclosed subject matter. The multiload relay 400 may be an electrical circuit that support charging a plurality of devices, such as device 20, wherein the plurality of relays of the multiload relay 400 may be inductively powered by Tx 100 through medium 10.

In some preferred embodiments of the disclosed subject matter, the multiload relay 400 electrical circuit may comprise a Tx 100 facing branch based on relay coil Lr 310 and three, device facing, branches based on load-coils, wherein all the branches are electrically connected in parallel to one another. Each load-coil branch comprises a capacitor, 1Cr 331 for 1Lr 321, 2Cr 332 for 2Lr 322 and NCr 33N for NLr 32N to form an independent resonance circuit for each branch, wherein each load-coil branch may be dedicated to charging spots 421, 422 and 42N respectively.

Tx 100 facing (main) branch comprises relay coil Lr 310 capacitor Cr 230 that together with parallelly connected tuning capacitor Crr 231 and inductor Lrr 311 form a resonance circuit. In some exemplary embodiments, each load-coil branch, together with the main branch is tuned to a different resonance frequency, thus producing different JRF and different OPF with Lt 110. Based on this architecture, Tx 100 may operate at an OPF that is close but substantially different than MRF of a chosen load-coil, for routing the energy to the chosen load-coil. Thus, creating maximal excitation to the chosen load-coil, while producing significantly low excitation and transferred power to the other load-coils. The above architecture allows cost effective implementation of multiload relay for supports larger charging area and multi charging spots.

In some exemplary embodiments of the disclosed subject matter, the Tx 100 may provide inductive charging energy to at least two different load-coils simultaneously, for charging devices 20 situated on the charging spots of the at least two load-coils. In such simultaneously charging embodiments, the controller 151 may generate an interleaved PWM signal (IPWM) comprised of a PWM signal (1stPWM) for the first load-coil and a PWM signal (2ndPWM) for the second load-coil, wherein each period of the IPWM may be composed of 1stPWM and 2ndPWM timeslots. Thus, the IPWM can cause the driver 152 to deliver power to the first and second load-coils based on the needs of the devices 20 that are placed on them, since each timeslot, at a time, effects the driver 152 with OPF, duty-cycle and amplitude associated to each load-coil.

In some exemplary embodiments, the timeslot period may be based on a common frequency that all resonance frequencies of all of the active load-coils are an integer division of it, whereas the width of the assigned slots relates to the relative power to be transferred to the specific load-coil. In an exemplary implementation, the OPF of the at least two load-coils may be selected to be an integer division of single slot frequency. For operation using full bridge, it is preferred that both integers may be even division of single slot frequency.

Figure 5A:
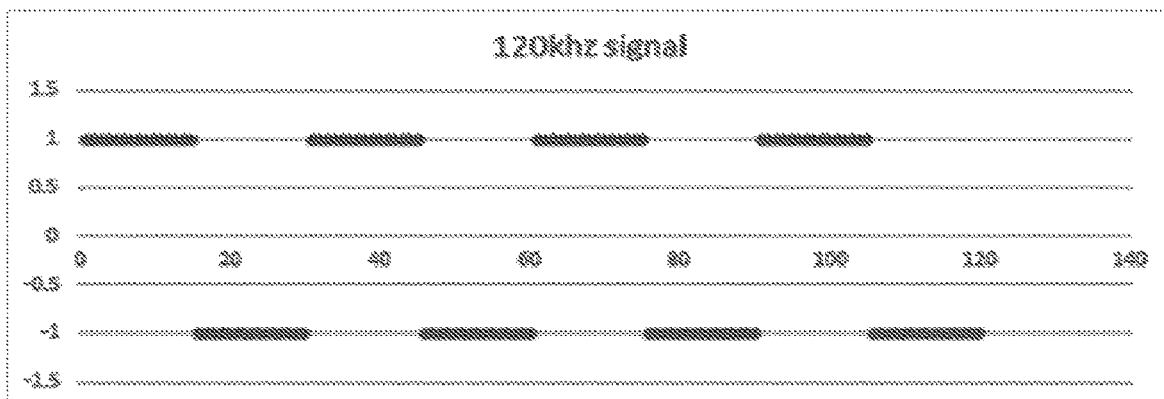
FIGS. 5A-5C shows an example of PWM and interleaved PWM timing diagrams, in accordance with some exemplary embodiments of the disclosed subject matter.
Figure 5B:
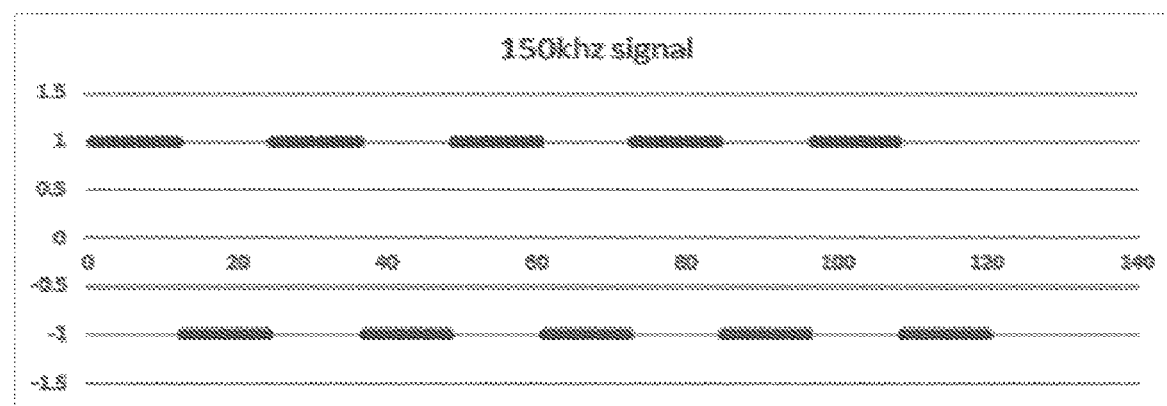
Figure 5C:
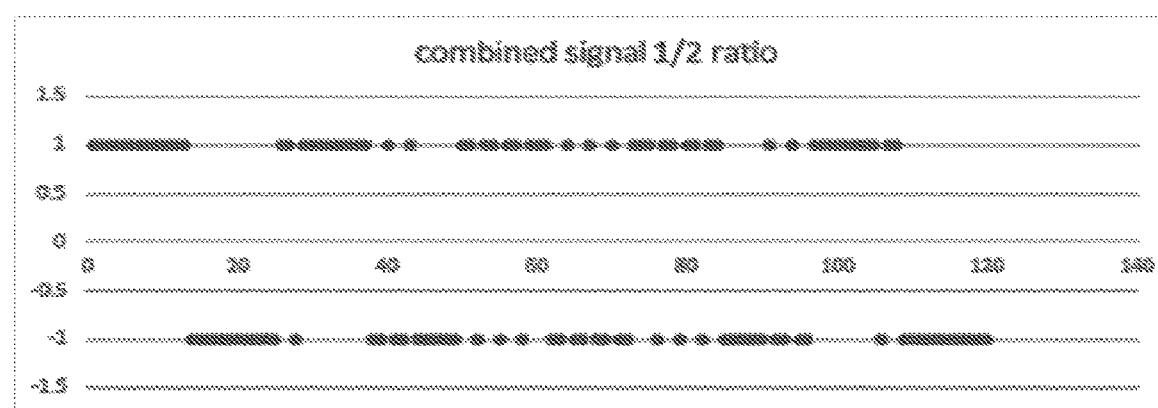

Referring now to FIGS. 5A-5C showing an example of PWM and interleaved PWM timing diagrams, in accordance with some exemplary embodiments of the disclosed subject matter. The example refers to an embodiment of two load-coils, having OPF of 120 khz (FIG. 5A) and 150 khz (FIG. 5B), wherein the interleaved frequency is set to 1.2 Mhz, thus integer of 10 and 8 respectively.

Each period is splatted into two slots, one for each load-coil, wherein the slot duration can be derived from the relative power requested by each device 20. During the first timeslot 1st PWM originated at controller 151, shall cause drive 152 to deliver power to the first load-coil branch, e.g. charging spot 421. During the second timeslot 2nd PWM, originated at controller 151, shall cause drive 152 to deliver power to the second load-coil branch, e.g. charging spot 422. Wherein, the 1st PWM and 2nd PWM are OPF that are close but substantially different than the specific MRF of each load-coil.

FIG. 5C shows interleaved timing diagram of an exemplary scenario, where the first load-coil operating at 120 khz, requires half as much power as the second load-coil operating at 150 khz, and their combined power consumption is equal to the overall power that may be driven by Tx 100.

Figure 6A:
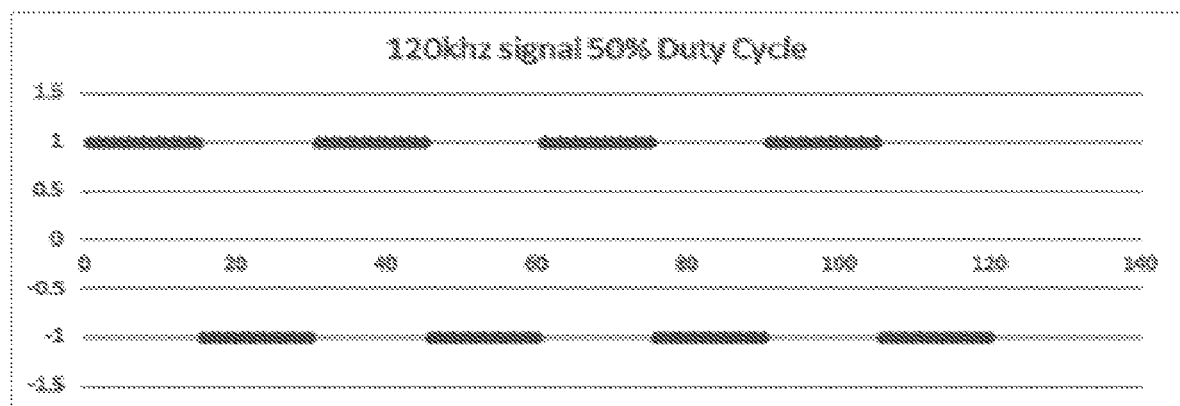
FIGS. 6A-6C shows another example of PWM and interleaved PWM timing diagrams, in accordance with some exemplary embodiments of the disclosed subject matter.
Figure 6B:
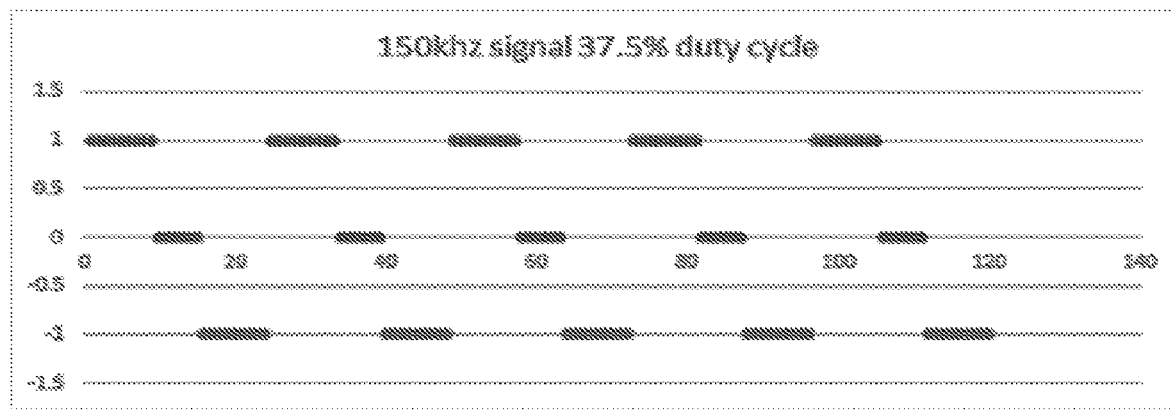
Figure 6C:
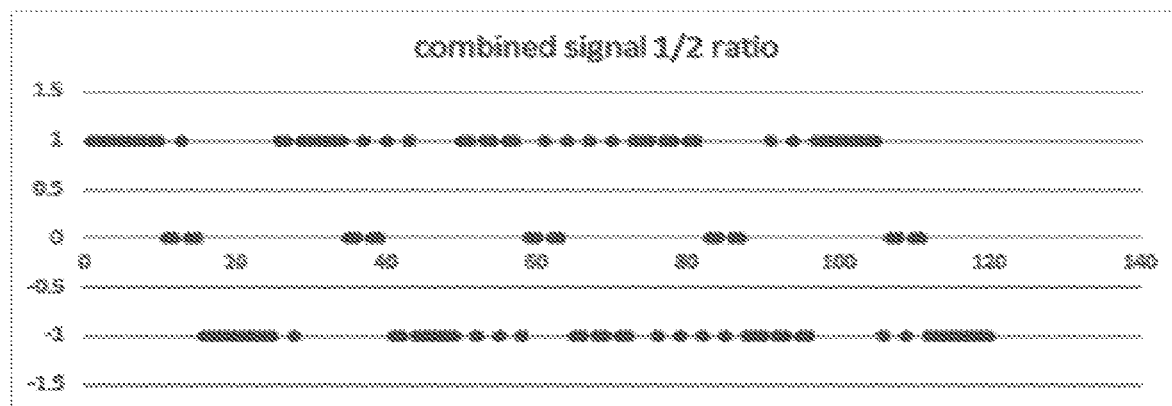

Referring now to FIGS. 6A-6C showing another example of PWM and interleaved PWM timing diagrams, in accordance with some exemplary embodiments of the disclosed subject matter. This example also refers to an embodiment of two load-coils having OPF of 120 khz (FIG. 6A) and 150 khz (FIG. 6B), wherein the interleaved frequency is set to 1.2 Mhz, thus integer of 10 and 8, respectively. However, in this example, the power ratio between the first (FIG. 6A) and the second (FIG. 6B) is slightly lower than 2 to 1, and the combined power is lower than maximal driving power of the Tx 100. Thus, since the second load-coil (150 kHz) has higher power, its duty-cycle is reduced to 37.5% instead of 50%, whereas, the slot time ratio is kept at 1/2.

In some exemplary embodiments, the OPF used for driving a load-coil may be selected to be slightly off the resonance frequency of load-coil in order to improve stability and tolerance to load switches.

One technical problem dealt with by the disclosed subject matter is handling communication with multiple devices, such as device 20. The problem may be manifested since the devices use asynchronous communication over load modulation and since multiple devices may attempt to communicate with Tx 100 at the same time.

It will be noted that in steady-state, commercially available devices such as device 20, communicate packets with transmitters that comprise power control and power reports information at fixed time intervals. A fixed time interval may be interrupted due changes of any of the steady-state operational parameters. Upon startup, the devices communicate at fixed time interval from power signal initiation.

One technical solution is to control by controller 151 the transmission timing of the devices to prevent significant communication overlap between the plurality of devices served by multiload relay 400. In some exemplary embodiments, when a device is placed, for example, on spot 401, and it is already operational with Tx 100, the controller 151 may analyze its fixed time interval and generate digital pings to other devices, so that the expected communication from the other devices would not overlap with the fixed time interval of the device placed on spot 401 and one another.

Another technical solution is to off phase the devices communication timing. In some exemplary embodiments, controller 151 may alter the duty-cycle for OPF of the load-coil that charge one of the devices. consequently, the device will shortly respond with power modification request, which will result by shifting its fixed time interval so as to avoid overlapping communication with the other device.

Yet another technical solution is adding to the Tx 100 filters that segregate the load modulation applied for each OPF of the OPFs. In some exemplary embodiments, this approach enables the TX 100 to simultaneously decode communication coming from multiple different devices at the same time.

In some exemplary embodiments, the communication from the transmitter to the devices may be based on frequency modulation such that a modification to the OPF can be performed for each device separately in the applicable timeslot.

It will be noted that some communication packet loss may have insignificant impact on the normal operation of the present disclosure system.

the multiload relay concept of the present disclosure system as depicted above is not necessarily limited to separated Tx 100 and relay architecture and may be utilized in commercially available architectures. For utilizing the multiload relay concept with commercially available systems, the driving circuitry of the transmitter can be connected in parallel to the multiple load coils with their individual resonance capacitors. The components detailed above may be implemented as one or more sets of interrelated computer instructions, executed for example by controller 151 or by another processor. The components may be arranged as one or more executable files, dynamic libraries, static libraries, methods, functions, services, or the like, programmed in any programming language and under any computing environment.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A system for wirelessly charging, via a medium, a device having a receiver coil, the system comprising:
    at least one relay configured to inductively transfer power to the receiver coil of the device; and
    a transmitter configured to inductively transmit, to the at least one relay, power for charging the device, wherein the transmitter and the at least one relay are separated by the medium and wherein the at least one relay and the transmitter substantially face each other,
    wherein the transmitter further comprises a transmitter coil and a transmitter capacitor constituting a transmitter resonance circuit,
    wherein the at least one relay further comprises a first relay coil and a relay capacitor constituting a relay resonance circuit,
    wherein a joint resonance frequencies (JRF) of the transmitter resonance circuit and the relay resonance circuit have a main resonance frequency (MRF),
    wherein the transmitter is configured to operate at an operational frequency (OPF) from a range of OPFs, wherein the range of OPFs is different than the MRF, and
    wherein the at least one relay comprises a second relay coil connected in series to the first relay coil, wherein one side of the second relay coil faces the device and a second side of the second relay coil is covered by a first relay ferrite layer, and wherein the second relay coil is smaller than the first relay coil.

2. The system of claim 1, wherein the transmitter coil and the first relay coil substantially facing each other and wherein the transmitter coil and the first relay coil are substantially equal in size and are larger than the receiver coil.

3. The system of claim 1, wherein the at least one relay further comprises a second relay ferrite layer having an opening, wherein the first relay ferrite layer lies on the first relay coil on a side that faces the device, and wherein a size of the opening is equal to or larger than a size of the receiver coil.

4. The system of claim 1, wherein the first relay coil and the second relay coil are arranged on two plains.

5. The system of claim 1, wherein the at least one relay further comprises a plurality of second relay coils for simultaneously charging a plurality of devices, wherein the plurality of the second relay coils is a plurality of load-coils resonance circuits connected in parallel to the relay resonance circuit, wherein each load-coil having a different resonance frequency is configured to charge one device of the plurality devices.

6. The system of claim 5, wherein the transmitter is configured to control power transmission to each load-coil by an interleaved PWM signal, wherein the interleaved PWM signal is comprised of timeslots, each of which is dedicated for specific load-coil, and wherein each timeslot is comprised of a PWM signal of the specific load-coil.

7. The system of claim 6, wherein the timeslot has a duration and is determined based on power needs of each device, and wherein the power needs are communicated by each device of the plurality of devices to the transmitter.

8. The system of claim 1, wherein the transmitter further comprises a transmitter electronics and a transmitter ferrite layer, wherein the transmitter ferrite layer is situated as a buffer between the transmitter coil and the transmitter electronics, and wherein the transmitter coil faces the at least one relay via the medium.

9. The system of claim 8, wherein the transmitter electronics are configured to determine the OPF and the range of the OPFs for controlling the power transmission by a pulse width modulation (PWM) signal, and wherein the transmitter electronics are configured to communicate with the device.

10. The system of claim 9, wherein the transmitter electronics are configured to synchronize a plurality of devices communication to avoid communication overlapping between at least two devices.

11. The system of claim 10, wherein the transmitter electronics are configured to synchronize the plurality of devices communication by changing the delivered power to one of the at least two overlapping devices.

12. The system of claim 11, wherein the transmitter electronics are capable of simultaneously distinguishing between the plurality of devices communications by utilizing filters tuned around resonance frequencies of a plurality of receiver coils.

13. A relay for wirelessly charging a device having a receiver coil, the relay comprising:
   a relay resonance circuit comprising at first relay coil and at least one relay capacitor,
   wherein the relay is configured to inductively receive power transmitted from a transmitter resonance circuit of a transmitter through a medium and to inductively transfer the power to the receiver coil of the device, the transmitter operating at an operational frequency (OPF) from a range of OPFs,
   wherein the transmitter and the relay are separated by the medium and substantially face each other;
   wherein a joint resonance frequency (JRF) of the relay and transmitter resonance circuits comprise a main resonance frequency (MRF) and the range of OPFs are different than the MRF;
   wherein the relay further comprises a second relay coil connected in series to the first relay coil, wherein one side of the second relay coil faces the device and a second side of the second relay coil is covered by a relay ferrite layer;
   and wherein the second relay coil is smaller than the first relay coil.

14. The relay of claim 13, wherein the JRF is tuned to a second range lower than a desired maximal operational frequency of the transmitter and is higher than a resonance frequency of the receiver coil of the device.

15. The relay of claim 13, wherein an enclosure of the relay is secured to the medium.

16. The relay of claim 13, wherein the relay resonance circuit comprise at least two relay coils and the at least one relay capacitor.

17. The relay of claim 13, wherein the relay comprises a passive electronic circuit acting as a repeater for wirelessly transmitting the power from the transmitter to the device.

18. The relay of claim 13 further comprising a second relay ferrite layer having an opening, wherein the relay ferrite layer lies on the first relay coil on a side that faces the device, and wherein a size of the opening is equal to or larger than a size of the receiver coil.

19. The relay of claim 13, wherein the first relay coil and the second relay coil are arranged on two plains.

20. The relay of claim 13, further comprising a plurality of second relay coils for simultaneously charging a plurality of devices, wherein the plurality of the second relay coils is a plurality of load-coils resonance circuits connected in parallel to the relay resonance circuit, wherein each load-coil having a different resonance frequency is configured to charge one device of the plurality devices.

* * * * *